US012755504B2

(12) United States Patent
Chen et al.

(10) Patent No.: US 12,755,504 B2
(45) Date of Patent: Oct. 6, 2026

(54) SYSTEM AND METHOD OF CROSS-MODAL VISION-RADAR ALIGNMENT FOR OBJECT-LEVEL REPRESENTATION LEARNING

(71) Applicant: Robert Bosch GmbH, Stuttgart (DE)

(72) Inventors: Bingqing Chen, Pittsburgh, PA (US); Csaba Domokos, Simmozheim (DE); Marcus Pereira, Pittsburgh, PA (US); Kilian Rambach, Stuttgart (DE); João D. Semedo, Pittsburgh, PA (US); Wan-Yi Lin, Wexford, PA (US); Leslie Berberian, Pittsburgh, PA (US)

(73) Assignee: Robert Bosch GmbH (DE)

(*) Notice: Subject to any disclaimer, the term of this patent is extended or adjusted under 35 U.S.C. 154(b) by 264 days.

(21) Appl. No.: 18/757,844

(22) Filed: Jun. 28, 2024

(65) Prior Publication Data

US 2026/0004543 A1 Jan. 1, 2026

(51) Int. Cl.
*G06K 9/00* (2022.01)
*G06V 10/25* (2022.01)

(52) U.S. Cl.
CPC .......... *G06V 10/25* (2022.01); *G06V 2201/07* (2022.01)

(58) Field of Classification Search
CPC ..... G06V 10/25; G06V 2201/07; G06V 10/82
See application file for complete search history.

(56) References Cited

U.S. PATENT DOCUMENTS 10,451,712 B1 * 10/2019 Madhow ............... G01S 13/723
11,494,937 B2 * 11/2022 Urtasun ................. G06N 3/084
(Continued)

FOREIGN PATENT DOCUMENTS

EP 3327617 A2 * 5/2018 ............. G06F 18/24
WO WO-2020140047 A1 * 7/2020 ............. G06V 10/70
WO WO-2021007100 A1 * 1/2021 ............. G06V 20/64

OTHER PUBLICATIONS

A Survey of Self-Supervised and Few-Shot Object Detection, Gabriel Huang et al., IEEE, Apr. 2023, pp. 4071-4089 (Year: 2023).*
LIP-Loc: LiDAR Image Pretraining for Cross-Modal Localization, Sai Shubodh Puligilla et al., arXiv, 2023, pp. 1-15 (Year: 2023).*
Cross Modal Transformer: Towards Fast and Robust 3D Object Detection, Junjie Yan et al., arXiv, 2023, pp. 1-11 (Year: 2023).*
(Continued)

*Primary Examiner* — Jayesh A Patel
(74) *Attorney, Agent, or Firm* — Dickinson Wright PLLC

(57) ABSTRACT

A method includes receiving a plurality of paired input images, wherein the paired images includes a first set of images from a first modality and a second set of images from a second modality, outputting a list of bounding boxes and labels in response to running an image-based object detection model, mapping each bounding box to a region of interest that is corresponding to the bounding box and associated with the second set of images, cropping the region of interest from the first and second set of images to generate a cropped first and second set of images, sending the cropped first set of images to a first encoder and a cropped second set of images to a second encoder, wherein the first encoder is configured for the first modality and the second encoder is configured for the second modality, outputting object-level embeddings for both the cropped first and second set of images utilizing encoders, identifying a loss function associated with the images, and in response to when a threshold is met, outputting final updated parameters.

20 Claims, 9 Drawing Sheets

(56) References Cited

U.S. PATENT DOCUMENTS

| | | | | |
|---|---|---|---|---|
| 11,887,324 | B2 * | 1/2024 | Tan | G06T 7/70 |
| 2011/0191374 | A1 * | 8/2011 | Bengio | G06F 16/53<br>707/E17.014 |
| 2018/0300620 | A1 * | 10/2018 | Gerardo Castro | G06N 3/08 |
| 2021/0012166 | A1 * | 1/2021 | Braley | G06F 18/251 |
| 2022/0300746 | A1 * | 9/2022 | Park | G01S 7/4802 |
| 2023/0021926 | A1 * | 1/2023 | Zhao | G06V 10/751 |
| 2023/0038578 | A1 * | 2/2023 | Hotson | G06V 20/64 |
| 2024/0096074 | A1 * | 3/2024 | Okorn | G06N 3/0455 |
| 2024/0419382 | A1 * | 12/2024 | Dekel | G06V 20/70 |
| 2025/0095168 | A1 * | 3/2025 | Kabalar | G06V 20/58 |
| 2025/0225779 | A1 * | 7/2025 | Rambach | G01S 13/865 |
| 2025/0381983 | A1 * | 12/2025 | Zhang | B60W 60/001 |

OTHER PUBLICATIONS

RangeLVDet: Boosting 3D Object Detection in LIDAR With Range Image and RGB Image, Zehan Zhang et al., IEEE, 2022, pp. 1391-1403 (Year: 2022).*

Fusion of 3D LIDAR and Camera Data for Object Detection in Autonomous Vehicle Applications, Xiangmo Zhao et al., IEEE, 2020, pp. 4901-4913 (Year: 2020).*

Cross Modal Focal Loss for RGBD Face Anti-Spoofing, Anjith George et al., CVF, 2021, pp. 7882-7891 (Year: 2021).*

CMX: Cross-Modal Fusion for RGB-X Semantic Segmentation With Transformers, Jiaming Zhang et al., IEEE, 2023, pp. 14679-14694 (Year: 2023).*

Cross-Modal Contrastive Learning of Representations for Navigation using Light-Weight, Low-Cost Millimeter Wave Radar for Adverse Enviornmental Conditions, Jui-Te Huang et al., arXiv, 2021, pp. 1-8 (Year: 2021).*

He, Kaiming, Georgia Gkioxari, Piotr Dollar, and Ross Girshick. “Mask r-cnn.” In Proceedings of the IEEE international conference on computer vision, pp. 2961-2969. 2017.

Huang, Jui-Te, Chen-Lung Lu, Po-Kai Chang, Ching-I. Huang, Chao-Chun Hsu, Po-Jui Huang, and Hsueh-Cheng Wang. “Cross-modal contrastive learning of representations for navigation using lightweight, low-cost millimeter wave radar for adverse environmental conditions.” IEEE Robotics and Automation Letters 6, No. 2 (2021): 3333-3340.

Li, Liunian Harold, Pengchuan Zhang, Haotian Zhang, Jianwei Yang, Chunyuan Li, Yiwu Zhong, Lijuan Wang et al. “Grounded language-image pre-training.” In Proceedings of the IEEE/CVF Conference on Computer Vision and Pattern Recognition, pp. 10965-10975. 2022.

Milella, Annalisa, Giulio Reina, James Underwood, and Bertrand Douillard. “Combining radar and vision for self-supervised ground segmentation in outdoor environments.” In 2011 IEEE/RSJ International Conference on Intelligent Robots and Systems, pp. 255-260. IEEE, 2011.

Radford, Alec, Jong Wook Kim, Chris Hallacy, Aditya Ramesh, Gabriel Goh, Sandhini Agarwal, Girish Sastry et al. “Learning transferable visual models from natural language supervision.” In International conference on machine learning, pp. 8748-8763. PMLR, 2021.

Zhong, Yiwu, Jianwei Yang, Pengchuan Zhang, Chunyuan Li, Noel Codella, Liunian Harold Li, Luowei Zhou et al. “Regionclip: Region-based language-image pretraining.” In Proceedings of the IEEE/CVF Conference on Computer Vision and Pattern Recognition, pp. 16793-16803. 2022.

* cited by examiner

SYSTEM AND METHOD OF CROSS-MODAL VISION-RADAR ALIGNMENT FOR OBJECT-LEVEL REPRESENTATION LEARNING

TECHNICAL FIELD

The present disclosure relates to machine learning models, including those that utilize Contrastive Language Image Pre-training (CLIP) models.

BACKGROUND

Multi-modal alignment as a powerful pretext task. Pioneered in Contrastive Language Image Pre-training (CLIP), multi-modal alignment has been shown to be a powerful pre-text task for self-supervised learning (SSL). Specifically, multi-modal alignment utilizes unlabeled, paired data from different modalities, e.g., image and text pairs, and applies a contrastive objective on the paired data to pre-train representations for corresponding modalities. Since paired data are readily available on the internet and do not require human annotation, such a pre-training paradigm can scale up to an astronomical amount of data, e.g., 400 million pieces of data. The resulting representations can be transferred to a variety of downstream tasks with impressive performance, especially in zero-shot settings.

However, one of the limitations of CLIP is that its performance is poor on certain types of tasks, including fine-grained classification, such as "differentiating models of cars, species of flowers, and variants of aircraft." The limitations of CLIP on fine-grained classification tasks stem from, among other things, that CLIP's contrastive learning objective aligns a whole image to a whole sentence. Thus, CLIP captures the overall semantic meaning of an image/sentence, but is unable to ground a textual concept to an image region. This limitation is shown to also apply to object detection. To address this challenge, works such as Region-CLIP and Grounded Language-Image Pre-Training (GLIP) modify the CLIP objective to image regions and textual concepts. This enables these methods to learn object-level correspondence between image and text, thereby demonstrate strong performance on object detection tasks.

Prior art systems have previously attempted to apply multi-modal alignment to radar. For example, one prior art system may apply the multi-modal contrastive objective to paired LiDAR and millimeter-wave radar. Such a system may show that the contrastive objective outperforms the reconstruction one, as the reconstruction baselines hallucinate "noisy artifact walls or obstacles". This is unsurprising as the authors of CLIP made the same observation, specifically the contrastive objective outperforms the image captioning objective by 12-fold on a downstream zero-shot image classification task. They also observe that radar can supplement LiDAR in adverse conditions (e.g., smoky environments), where LiDAR performance is degraded.

There are prior systems that promise multi-modal contrastive learning for radar. A limitation is that the LiDAR-radar pairing assumes the existence of LiDAR sensors and that radar is "a noisy and randomly dropped augmentation" of LiDAR. Given the cost of LiDAR sensors, this limits the amount of data that can be collected for pre-training. Another limitation is that these systems, similar to CLIP, apply the contrastive objective on a pair of radar frame and LiDAR frame. Analogous to the limitation of CLIP, learning frame-level correspondence limits the method's ability to learn fine-granular features.

SUMMARY

A first illustrative embodiment discloses a computer-implemented method for a pre-trained machine-learning network that includes the steps of receiving a plurality of paired input images, wherein the paired images includes a first set of images from a first modality and a second set of images from a second modality, wherein the first modality is different than the second modality, outputting a list of bounding boxes and labels in response to running an image-based object detection model on the first set of images, mapping each bounding box to a region of interest that is corresponding to the bounding box and associated with the second set of images from the second modality, cropping the region of interest from the first set of images and second set of images to generate a cropped first set of images and a cropped second set of images, sending the cropped first set of images to a first encoder and a cropped second set of images to a second encoder, wherein the first encoder is configured for the first modality and the second encoder is configured for the second modality, outputting object-level embeddings for both the cropped first set of images and the cropped second set of images utilizing the first encoder and second encoder, respectively, identifying a loss function associated with the first set of images and the second set of images, and in response to when a threshold is met, and outputting final updated parameters associated with the first encoder and second encoder.

A second illustrative embodiment discloses, a system that includes a controller configured to receive a plurality of paired input images, wherein the paired images includes a first set of images from a first modality and a second set of images from a second modality, wherein the first modality is different than the second modality, output a list of bounding boxes and labels in response to running an image-based object detection model on the first set of images, map each bounding box to a region of interest that is corresponding to the bounding box and associated with the second set of images from the second modality, crop the region of interest from the first set of images and second set of images to generate a cropped first set of images and a cropped second set of images, send the cropped first set of images to a first encoder and a cropped second set of images to a second encoder, wherein the first encoder is configured for the first modality and the second encoder is configured for the second modality, output object-level embeddings for both the cropped first set of images and the cropped second set of images utilizing the first encoder and second encoder, respectively, identify a loss function associated with the first set of images and the second set of images, in response to when the threshold is met, output final updated parameters associated with the first encoder and second encoder.

A third illustrative embodiment discloses a computer-implemented method for a pre-trained machine-learning network, the computer-implemented method comprising the following steps of receiving a plurality of paired input images, wherein the paired images includes a first set of images from a first modality and a second set of images from a second modality, wherein the first modality is different than the second modality, outputting a list of bounding boxes and labels in response to running an image-based object detection model on the first set of images, mapping each bounding box to a region of interest that is corresponding to the bounding box and associated with the second set of images from the second modality, cropping the region of interest from the first set of images and second set of images to generate a cropped first set of images and a cropped second set of images, sending the cropped first set of images to a first encoder and a cropped second set of images to a second encoder, wherein the first encoder is configured for the first modality and the second encoder is configured for the second modality, outputting object-level embeddings for both the cropped first set of images and the cropped second set of images utilizing the first encoder and second encoder, respectively, and identifying a loss function associated with the first set of images and the second set of images.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative bases for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical application. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

Recent advances in multi-modal contrastive learning, such as CLIP and its many derivatives, open up the opportunity to utilize large amounts of unlabeled, paired datasets to pre-train foundation models that show strong transfer performance on a variety downstream tasks. However, such works concentrate on visual-language tasks. In comparison, work on radar is sparse. In this work, we extend existing works by applying the multi-modal contrastive learning objective on radar-image pairs.

Prior art systems may demonstrate the promise of multi-modal contrastive learning on radar modality. However, such previous approaches lag behind the state-of-the-art on multi-modal contrastive learning on visual-language tasks. In the present embodiment, the system and method may improve upon existing work by leveraging the recent advances in multi-modal contrastive learning to learn fine-granular features, which are essential for downstream tasks such as object detection and semantic segmentation.

Figure 1:
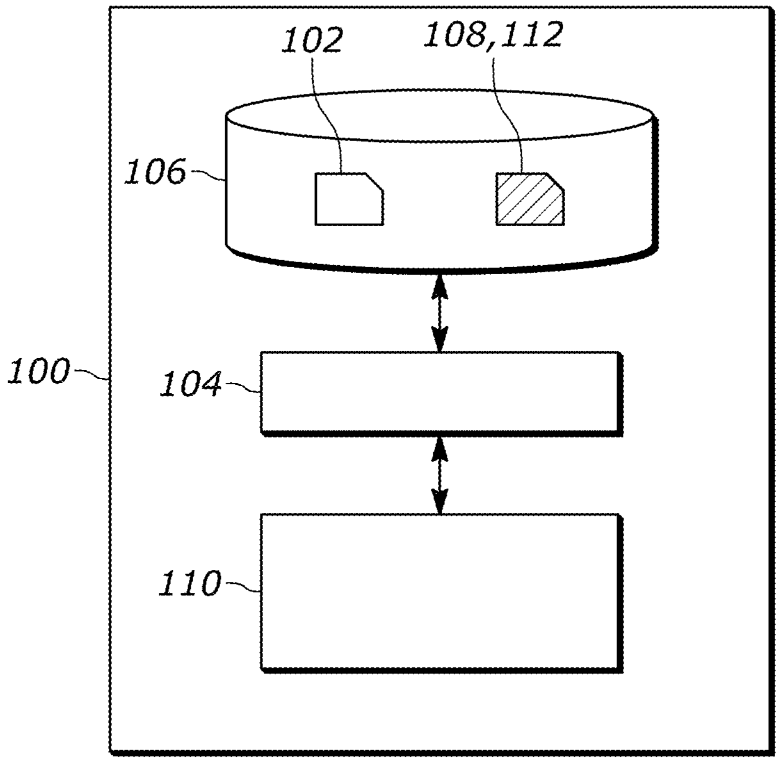
FIG. 1 shows a system for training a neural network, according to an embodiment.

Machine learning and neural networks are an integral part of the inventions disclosed herein. FIG. 1 shows a system 100 for training a neural network, e.g. a deep neural network. The system 100 may comprise an input interface for accessing training data 102 for the neural network. For example, as illustrated in FIG. 1, the input interface may be constituted by a data storage interface 104 which may access the training data 102 from a data storage 106. For example, the data storage interface 104 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 106 may be an internal data storage of the system 100, such as a hard drive or SSD, but also an external data storage, e.g., a network-accessible data storage.

In some embodiments, the data storage 106 may further comprise a data representation 108 of an untrained version of the neural network which may be accessed by the system 100 from the data storage 106. It will be appreciated, however, that the training data 102 and the data representation 108 of the untrained neural network may also each be accessed from a different data storage, e.g., via a different subsystem of the data storage interface 104. Each subsystem may be of a type as is described above for the data storage interface 104. In other embodiments, the data representation 108 of the untrained neural network may be internally generated by the system 100 on the basis of design parameters for the neural network, and therefore may not explicitly be stored on the data storage 106. The system 100 may further comprise a processor subsystem 110 which may be configured to, during operation of the system 100, provide an iterative function as a substitute for a stack of layers of the neural network to be trained. Here, respective layers of the stack of layers being substituted may have mutually shared weights and may receive as input an output of a previous layer, or for a first layer of the stack of layers, an initial activation, and a part of the input of the stack of layers. The processor subsystem 110 may be further configured to iteratively train the neural network using the training data 102. Here, an iteration of the training by the processor subsystem 110 may comprise a forward propagation part and a backward propagation part. The processor subsystem 110 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the neural network. The system 100 may further comprise an output interface for outputting a data representation 112 of the trained neural network; this data may also be referred to as trained model data 112. For example, as also illustrated in FIG. 1, the output interface may be constituted by the data storage interface 104, with said interface being in these embodiments an input/output ('IO') interface, via which the trained model data 112 may be stored in the data storage 106. For example, the data representation 108 defining the 'untrained' neural network may during or after the training be replaced, at least in part by the data representation 112 of the trained neural network, in that the parameters of the neural network, such as weights, hyperparameters and other types of parameters of neural networks, may be adapted to reflect the training on the training data 102. This is also illustrated in FIG. 1 by the reference numerals 108, 112 referring to the same data record on the data storage 106. In other embodiments, the data representation 112 may be stored separately from the data representation 108 defining the 'untrained' neural network. In some embodiments, the output interface may be separate from the data storage interface 104, but may in general be of a type as described above for the data storage interface 104.

Figure 2:
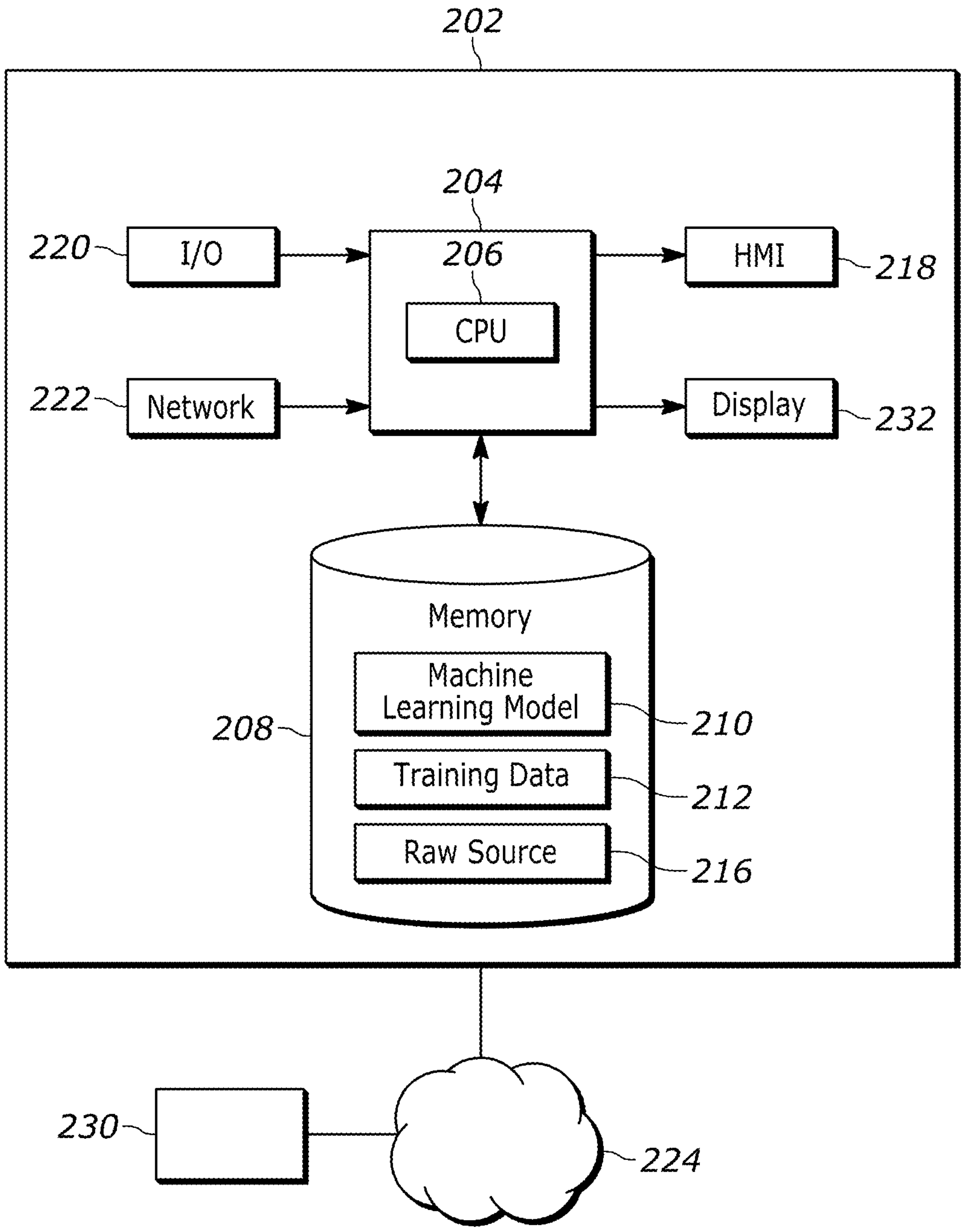
FIG. 2 shows a computer-implemented method for training and utilizing a neural network, according to an embodiment.

FIG. 2 depicts a system 200 to implement the machine-learning models and neural networks described herein. The system 200 can be implemented to train the neural network. The system 200 may include at least one computing system 202. The computing system 202 may include at least one processor 204 that is operatively connected to a memory unit 208. The processor 204 may include one or more integrated circuits that implement the functionality of a central processing unit (CPU) 206. The CPU 206 may be a commercially available processing unit that implements an instruction set such as one of the x86, ARM, Power, or MIPS instruction set families. During operation, the CPU 206 may execute stored program instructions that are retrieved from the memory unit 208. The stored program instructions may include software that controls operation of the CPU 206 to perform the operation described herein. In some examples, the processor 204 may be a system on a chip (SoC) that integrates functionality of the CPU 206, the memory unit 208, a network interface, and input/output interfaces into a single integrated device. The computing system 202 may implement an operating system for managing various aspects of the operation. While one processor 204, one CPU 206, and one memory 208 is shown in FIG. 2, of course more than one of each can be utilized in an overall system.

The memory unit 208 may include volatile memory and non-volatile memory for storing instructions and data. The non-volatile memory may include solid-state memories, such as NAND flash memory, magnetic and optical storage media, or any other suitable data storage device that retains data when the computing system 202 is deactivated or loses electrical power. The volatile memory may include static and dynamic random-access memory (RAM) that stores program instructions and data. For example, the memory unit 208 may store a machine-learning model 210 or algorithm, a training dataset 212 for the machine-learning model 210, raw source dataset 216.

The computing system 202 may include a network interface device 222 that is configured to provide communication with external systems and devices. For example, the network interface device 222 may include a wired and/or wireless Ethernet interface as defined by Institute of Electrical and Electronics Engineers (IEEE) 802.11 family of standards. The network interface device 222 may include a cellular communication interface for communicating with a cellular network (e.g., 3G, 4G, 5G). The network interface device 222 may be further configured to provide a communication interface to an external network 224 or cloud.

The external network 224 may be referred to as the world-wide web or the Internet. The external network 224 may establish a standard communication protocol between computing devices. The external network 224 may allow information and data to be easily exchanged between computing devices and networks. One or more servers 230 may be in communication with the external network 224.

The computing system 202 may include an input/output (I/O) interface 220 that may be configured to provide digital and/or analog inputs and outputs. The I/O interface 220 is used to transfer information between internal storage and external input and/or output devices (e.g., HMI devices). The I/O 220 interface can includes associated circuity or BUS networks to transfer information to or between the processor(s) and storage. For example, the I/O interface 220 can include digital I/O logic lines which can be read or set by the processor(s), handshake lines to supervise data transfer via the I/O lines, timing and counting facilities, and other structure known to provide such functions. Examples of input devices include a keyboard, mouse, sensors, etc. Examples of output devices include monitors, printers, speakers, etc. The I/O interface 220 may include additional serial interfaces for communicating with external devices (e.g., Universal Serial Bus (USB) interface). The I/O interface 220 can be referred to as an input interface (in that it transfers data from an external input, such as a sensor), or an output interface (in that it transfers data to an external output, such as a display).

The computing system 202 may include a human-machine interface (HMI) device 218 that may include any device that enables the system 200 to receive control input. Examples of input devices may include human interface inputs such as keyboards, mice, touchscreens, voice input devices, and other similar devices. The computing system 202 may include a display device 232. The computing system 202 may include hardware and software for outputting graphics and text information to the display device 232. The display device 232 may include an electronic display screen, projector, or other suitable device for displaying information to a user or operator. The computing system 202 may be further configured to allow interaction with remote HMI and remote display devices via the network interface device 222.

The system 200 may be implemented using one or multiple computing systems. While the example depicts a single computing system 202 that implements all of the described features, it is intended that various features and functions may be separated and implemented by multiple computing units in communication with one another. The particular system architecture selected may depend on a variety of factors.

The system 200 may implement a machine-learning algorithm 210 that is configured to analyze the raw source dataset 216. The raw source dataset 216 may include raw or unprocessed sensor data that may be representative of an input dataset for a machine-learning system. The raw source dataset 216 may include video, video segments, images, text-based information, audio or human speech, time series data (e.g., a pressure sensor signal over time), and raw or partially processed sensor data (e.g., radar map of objects). Several different examples of inputs are shown and described with reference to FIGS. 5-11. In some examples, the machine-learning algorithm 210 may be a neural network algorithm (e.g., deep neural network) that is designed to perform a predetermined function. For example, the neural network algorithm may be configured in automotive applications to identify street signs or pedestrians in images.

The computing system 202 may store a training dataset 212 for the machine-learning algorithm 210. The training dataset 212 may represent a set of previously constructed data for training the machine-learning algorithm 210. The training dataset 212 may be used by the machine-learning algorithm 210 to learn weighting factors associated with a neural network algorithm. The training dataset 212 may include a set of source data that has corresponding outcomes or results that the machine-learning algorithm 210 tries to duplicate via the learning process. In this example, the training dataset 212 may include input images that include an object (e.g., a street sign). The input images may include various scenarios in which the objects are identified.

The machine-learning algorithm 210 may be operated in a learning mode using the training dataset 212 as input. The machine-learning algorithm 210 may be executed over a number of iterations using the data from the training dataset 212. With each iteration, the machine-learning algorithm 210 may update internal weighting factors based on the achieved results. For example, the machine-learning algorithm 210 can compare output results (e.g., a reconstructed or supplemented image, in the case where image data is the input) with those included in the training dataset 212. Since the training dataset 212 includes the expected results, the machine-learning algorithm 210 can determine when performance is acceptable. After the machine-learning algorithm 210 achieves a predetermined performance level (e.g., 100% agreement with the outcomes associated with the training dataset 212), or convergence, the machine-learning algorithm 210 may be executed using data that is not in the training dataset 212. It should be understood that in this disclosure, "convergence" can mean a set (e.g., predetermined) number of iterations have occurred, or that the residual is sufficiently small (e.g., the change in the approximate probability over iterations is changing by less than a threshold), or other convergence conditions. The trained machine-learning algorithm 210 may be applied to new datasets to generate annotated data.

The machine-learning algorithm 210 may be configured to identify a particular feature in the raw source data 216. The raw source data 216 may include a plurality of instances or input dataset for which supplementation results are desired. For example, the machine-learning algorithm 210 may be configured to identify the presence of a road sign in video images and annotate the occurrences. The machine-learning algorithm 210 may be programmed to process the raw source data 216 to identify the presence of the particular features. The machine-learning algorithm 210 may be configured to identify a feature in the raw source data 216 as a predetermined feature (e.g., road sign). The raw source data 216 may be derived from a variety of sources. For example, the raw source data 216 may be actual input data collected by a machine-learning system. The raw source data 216 may be machine generated for testing the system. As an example, the raw source data 216 may include raw video images from a camera.

Figure 3:
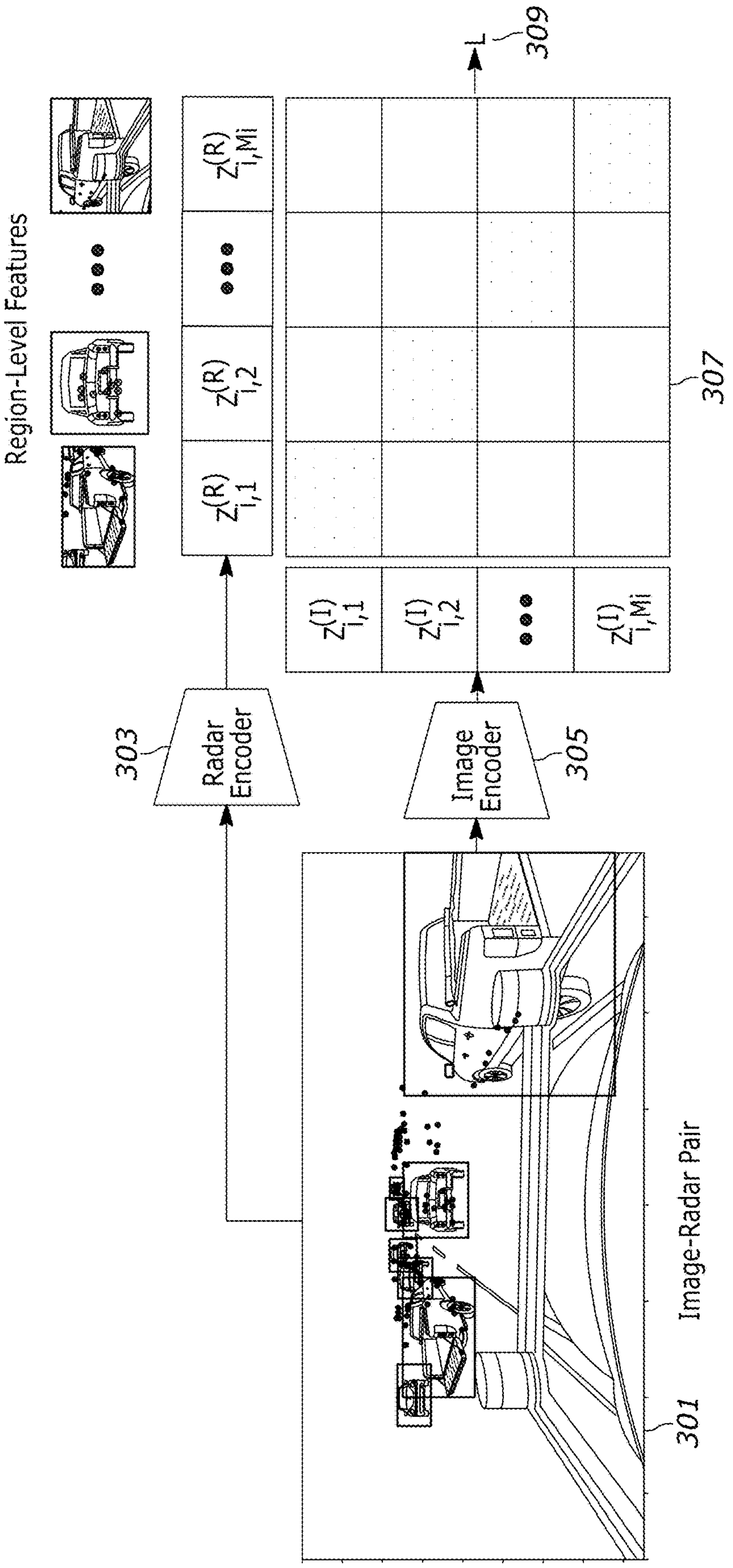
FIG. 3 discloses an overview of a system including a cross-modal alignment for object-level representation learning in one embodiment.

FIG. 3 discloses an overview of a system in one embodiment. At 301, an input data may be sent to both a first encoder and a second encoder. The input data may include an image-radar pair 301. The image-radar paired data may include image data that it is taken from a camera or another type of sensor. The camera may capture image data. While radar and image is utilized on this embodiment, other modalities may be utilized. For example, image data may be paired with sound data or Lidar data. In another example, Lidar data, radar data, image data, sound data, and other data captured by sensors may be interchangeable. The system may denote the paired dataset as $$\mathcal{D} = (x_i^{(a)}, x_i^{(b)})_{i=1,\ldots,N},$$

where the superscript refers to the modality. The modalities of the paired data may be from different sensors.

The system may first run an off-the-shelf image-based object detection model on $$x_i^{(image)}.$$

This leads to a list of bounding boxes and labels, which we denote as $$(\mathcal{B}_{i,k}^{(image)}, y_{i,k})_{k=1,\ldots,M_i} \cdot \mathcal{B}_{i,k}^{(image)} \in \mathbb{R}^4$$

describes the coordinates of the bounding box, which can be in COCO format, i.e., [x, y, w, h], $y_{i,k}$ is the class label of the bounding box, and $M_i$ is the number of bounding boxes per image. The underlying rationale is that image-based object detection is a mature technology, and an off-the-shelf object detector can be expected to work well on common scenarios. If no off-the-shelf object detector suffices for the application, one can train/fine-tune a new object detector.

For each bounding box, the system can map it to a region of interest in the corresponding radar sample, in either point cloud or spectrum representation. For instance, the system may utilize a camera matrix, which maps 3D points to 2D projection on to an image, to find a region of interest in radar point cloud. The system may denote such as a mapping as $\mathbb{P}$, and $$\mathcal{B}_{i,k}^{(radar)} = \mathbb{P}\left[\mathcal{B}_{i,k}^{(image)}\right].$$

The first encoder 303, may be a radar encoder in one embodiment. The radar encoder 303 may be a trained radar encoder. The second encoder 305 may be an image encoder. The image encoder 305 may be a trained image encoder. The radar encoder may be utilized to encode positional data, such as the angle or azimuth of the radar antenna, into digital signals. The signals can then be utilized by the radar system to determine the direction of detected objects. The radar encoder may output signals in various formats, such as digital pulses, binary codes, or more complex communication protocols, depending on the specific requirements of the radar system. The paired data may be sent to both the radar encoder 303 and the image encoder 305. The encoders may be a CLIP encoder or any other similar encoder, such as a dyno encoder, pre-trained ViT (Vision Transformers) encoder, etc.

To be computationally-efficient, the system may pass each image/radar to its modality-specific encoder, and crop the regions of interest. Specifically, the system may take the feature maps prior to the final pooling and projection layers. Then, the system may find the area corresponding to the bounding boxes on the feature map with techniques, such as ROIAlign (Region of Interest Align). ROIAlign may be a technique that is used in the context of object detection and segmentation in deep learning. It is primarily utilized in architectures like Mask R-CNN. Passing these cropped feature maps through the final projection layer, the system may obtain paired, object-level embeddings $$\left(z_{i,k}^{(radar)}, z_{i,k}^{(image)}\right).$$

The paired embeddings may be analyzed in a mapping 307.

The system can pass these paired, object-level embeddings into the same loss function as CLIP. The system may generate a final loss 309 (e.g., known as $\mathcal{L}$). The final loss may be determined as:

$$\mathcal{L} = \sum_i \sum_{k=1}^{M_i} \mathcal{L}\left(z_{i,k}^{(radar)}, z_{i,k}^{(image)}\right),$$

Figure 4:
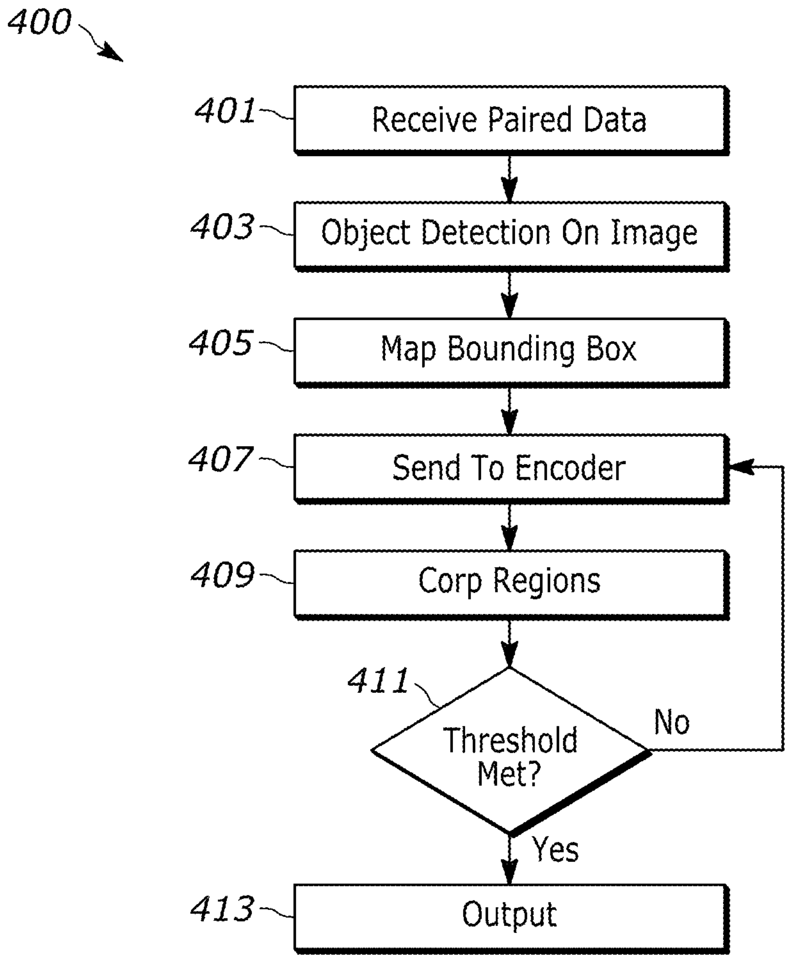
FIG. 4 discloses an overview of a flow chart utilizing steps of cross-modal alignment for object-level representation learning.

FIG. 4 illustrates an illustrative flow chart. At step 401, the system may receive the image data. The image data may include paired imaged data or individual image data that is individually paired. The image-radar paired data may include image data that it is taken from a camera (or any type of sensor) and a radar image (or any other type of sensor). While radar and image is utilized on this embodiment, other modalities may be utilized as long as they are different for the paired data.

At step 403, the system may run object detection on the image. The object detect may identify each object that is found in the specific image. The bounding boxes associated with the images may be later utilized in conjunction with the input or image from the other modality, such as a radar image or any other type of image. The cosine similarity may be utilized.

At step 405, the system may map the bounding box. The system may associate specific regions of an image with corresponding text descriptions. When working with bounding boxes, the system may attempt to localize parts of the image that correspond to certain textual descriptions. The model may process an image to extract high-level features to capture the content and context of different parts of the image. The bounding box may be a rectangular region within an image that may be utilized to highlight or isolate a specific object or area. The bounding max may be utilized to focus on that particular region of the image that is relevant to the text. To map the bounding box to a text description the system may utilize cosine similarity to determine the similarity between the text features and the image features within the bounding box. HCosine similarity may be defined as sim(u, v)=$u^T v/\|u\|\|v\|$, where u and v are two vectors of the same dimension.

Each sample is passed through modality-specific encoder and outputs an embedding, i.e.

$$z_i^{(p)} = f_{\phi_p}\left(x_i^{(p)}\right) \in \mathbb{R}^d,$$

where $p \in \{a, b\}$ and d denotes the latent dimension. While the proposed approach is agnostic to the inner workings of the modality-specific encoders, the latent dimension needs to be the same across modalities in order to calculate the cosine similarity.

In one embodiment, a CLIP model may be used. The multi-modal contrastive loss may be defined as:

$$l_1 = -\log\frac{\exp\left(sim\left(z_i^{(a)}, z_j^{(b)}\right)/\tau\right)}{\sum_k \exp\left(sim\left(z_i^{(a)}, z_k^{(b)}\right)/\tau\right)}$$

$$l_2 = -\log\frac{\exp\left(sim\left(z_i^{(a)}, z_j^{(b)}\right)/\tau\right)}{\sum_k \exp\left(sim\left(z_k^{(a)}, z_j^{(b)}\right)/\tau\right)}$$

$$\mathcal{L}\left(z_i^{(a)}, z_j^{(b)}\right) = (l_1 + l_2)/2$$

$\tau$ is a temperature parameter, which is a learnable parameter in the CLIP implementation.

Given a radar-image pair $$\left(x_{i,k}^{(radar)}, x_{i,k}^{(image)}\right),$$

the system may first run an off-the-shelf image-based object detection model on $$x_i^{(image)}.$$

This leads to a list of bounding boxes and labels, which is denoted as $$\left(\mathcal{B}_{i,k}^{(image)}, y_{i,k}\right)_{k=1,\ldots,M_i} \cdot \mathcal{B}_{i,k}^{(image)} \in \mathbb{R}^4$$

describes the coordinates of the bounding box, which can be in COCO format, i.e., [x, y, w, h], $y_{i,k}$ is the class label of the bounding box, and $M_i$ is the number of bounding boxes per image. The underlying rationale is that image-based object detection is a mature technology, and an off-the-shelf object detector can be expected to work well on common scenarios. If no off-the-shelf object detector suffices for the application, one can train/fine-tune a new object detector.

For each bounding box, the system can map it to a region of interest in the corresponding radar sample, in either point cloud or spectrum representation. For instance, the system may use the camera matrix, which maps 3D points to 2D projection on to an image, to find a region of interest in radar point cloud. The system may denote such as a mapping as $\mathbb{P}$, and $$\mathcal{B}_{i,k}^{(radar)} = \mathbb{P}\left[\mathcal{B}_{i,k}^{(image)}\right].$$

At step 407, the system passes each image/radar to its modality-specific encoder, and crop the regions of interest. Specifically, the process of the system may take the feature maps prior to the final pooling and projection layers.

At step 409, the system may crop the regions of interested in the image data. The system may take the feature maps prior to the final pooling and projection layers. Then, when the finding area corresponding to the bounding boxes on the feature map with techniques (such as ROIAlign). Passing these cropped feature maps through the final projection layer, the system may obtain paired, object-level embeddings $$\left(z_{i,k}^{(radar)}, z_{i,k}^{(image)}\right).$$

At decision 411, the system may determine if the threshold is met as related to the paired image data. The threshold may be related to a convergence threshold, such as the amount of loss that is determined, or a number of iterations that are ran. The system may run the following processes for a certain number of thresholds that may be dependent on a number of factors.

At step 413, the system may output a final loss upon meeting a threshold. The threshold may also be associated with the number of bounding boxes per image. Thus, the process may not be complete until all bounding boxes have been processed per the embodiments discussed. Upon the threshold meeting, the system may pass these paired, object-level embeddings into the same loss function as CLIP. The final loss may be calculated as:

$$\mathcal{L} = \sum_i \sum_{k=1}^{M_i} \mathcal{L}\left(z_{i,k}^{(radar)}, z_{i,k}^{(image)}\right)$$

The system then may update or tune parameters associated with the first encoder and/or second encoder when a final loss is established in one embodiment. The tuning may improve the classification or object detection of a machine learning network.

Figure 5:
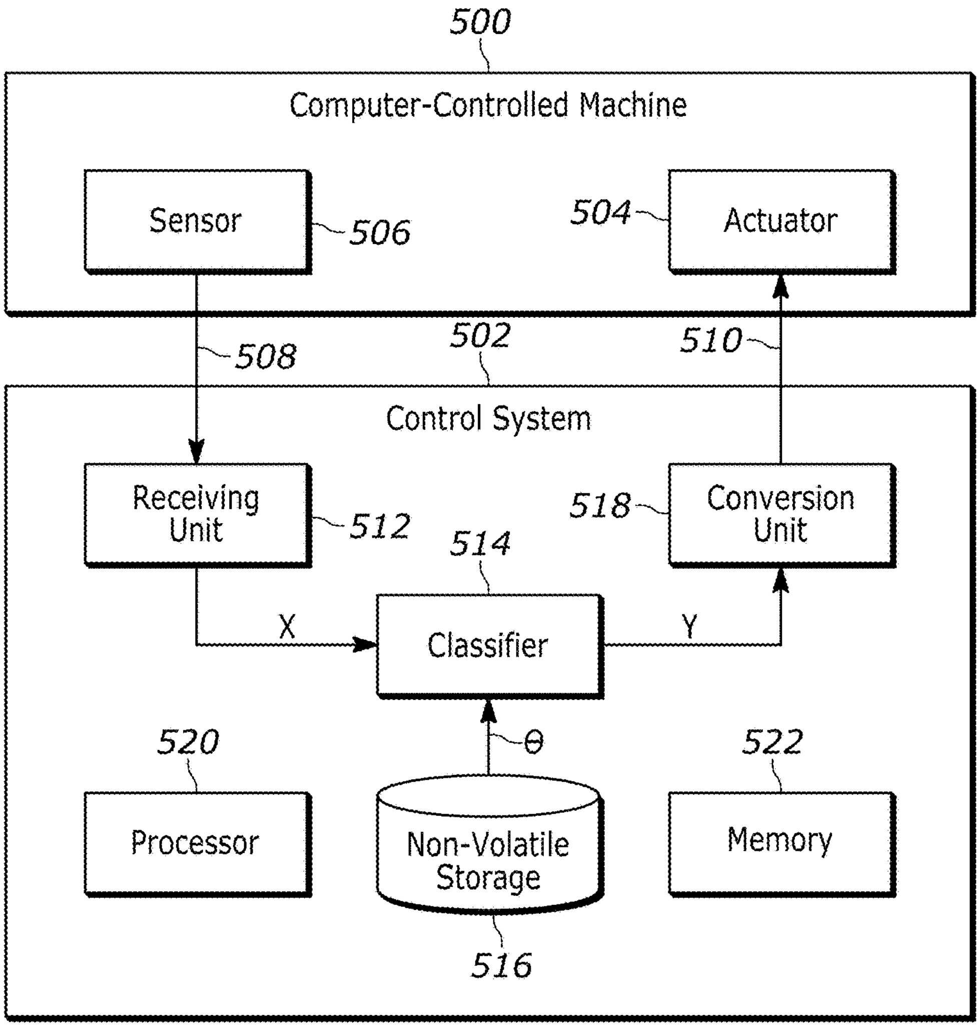
FIG. 5 depicts a schematic diagram of an interaction between a computer-controlled machine and a control system, according to an embodiment.

The methods and systems disclosed herein can be used in many different applications. Determining out-of-distribution data can be useful for a plethora of technologies, examples of which are illustrated in FIGS. 5-11. FIG. 5 depicts a schematic diagram of an interaction between a computer-controlled machine 500 and a control system 502. Computer-controlled machine 500 includes actuator 504 and sensor 506. Actuator 504 may include one or more actuators and sensor 506 may include one or more sensors. Sensor 506 is configured to sense a condition of computer-controlled machine 500. Sensor 506 may be configured to sense ID and/or OOD data, and the corresponding processors can be configured to determine whether the data is ID or OOD according to the teachings herein. Sensor 506 may be configured to encode the sensed condition into sensor signals 508 and to transmit sensor signals 508 to control system 502. Non-limiting examples of sensor 506 include a camera, video sensor, radar, LiDAR, ultrasonic and motion sensors, temperature sensors, and the like. In one embodiment, sensor 506 is an optical sensor configured to sense optical images of an environment proximate to computer-controlled machine 500.

Control system 502 is configured to receive sensor signals 508 from computer-controlled machine 500. As set forth below, control system 502 may be further configured to compute actuator control commands 510 depending on the sensor signals and to transmit actuator control commands 510 to actuator 504 of computer-controlled machine 500.

As shown in FIG. 5, control system 502 includes receiving unit 512. Receiving unit 512 may be configured to receive sensor signals 508 from sensor 506 and to transform sensor signals 508 into input signals x. In an alternative embodiment, sensor signals 508 are received directly as input signals x without receiving unit 512. Each input signal x may be a portion of each sensor signal 508. Receiving unit 512 may be configured to process each sensor signal 508 to product each input signal x. Input signal x may include data corresponding to an image recorded by sensor 506.

Control system 502 includes a classifier 514. Classifier 514 may be configured to classify input signals x into one or more labels using a machine-learning algorithm, such as a neural network described above. Classifier 514 is configured to be parametrized by parameters, such as those described above (e.g., parameter θ). Parameters θ may be stored in and provided by non-volatile storage 516. Classifier 514 is configured to determine output signals y from input signals x. Each output signal y includes information that assigns one or more labels to each input signal x. Classifier 514 may transmit output signals y to conversion unit 518. Conversion unit 518 is configured to covert output signals y into actuator control commands 510. Control system 502 is configured to transmit actuator control commands 510 to actuator 504, which is configured to actuate computer-controlled machine 500 in response to actuator control commands 510. In another embodiment, actuator 504 is configured to actuate computer-controlled machine 500 based directly on output signals y.

Upon receipt of actuator control commands 510 by actuator 504, actuator 504 is configured to execute an action corresponding to the related actuator control command 510. Actuator 504 may include a control logic configured to transform actuator control commands 510 into a second actuator control command, which is utilized to control actuator 504. In one or more embodiments, actuator control commands 510 may be utilized to control a display instead of or in addition to an actuator.

In another embodiment, control system 502 includes sensor 506 instead of or in addition to computer-controlled machine 500 including sensor 506. Control system 502 may also include actuator 504 instead of or in addition to computer-controlled machine 500 including actuator 504.

As shown in FIG. 5, control system 502 also includes processor 520 and memory 522. Processor 520 may include one or more processors. Memory 522 may include one or more memory devices. The classifier 514 (e.g., machine-learning algorithms, such as those described above with regard to pre-trained classifier 306) of one or more embodiments may be implemented by control system 502, which includes non-volatile storage 516, processor 520 and memory 522.

Non-volatile storage 516 may include one or more persistent data storage devices such as a hard drive, optical drive, tape drive, non-volatile solid-state device, cloud storage or any other device capable of persistently storing information. Processor 520 may include one or more devices selected from high-performance computing (HPC) systems including high-performance cores, microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 522. Memory 522 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information.

Processor 520 may be configured to read into memory 522 and execute computer-executable instructions residing in non-volatile storage 516 and embodying one or more machine-learning algorithms and/or methodologies of one or more embodiments. Non-volatile storage 516 may include one or more operating systems and applications. Non-volatile storage 516 may store compiled and/or interpreted from computer programs created using a variety of programming languages and/or technologies, including, without limitation, and either alone or in combination, Java, C, C++, C #, Objective C, Fortran, Pascal, Java Script, Python, Perl, and PL/SQL.

Upon execution by processor 520, the computer-executable instructions of non-volatile storage 516 may cause control system 502 to implement one or more of the machine-learning algorithms and/or methodologies as disclosed herein. Non-volatile storage 516 may also include machine-learning data (including data parameters) supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

The processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 6:
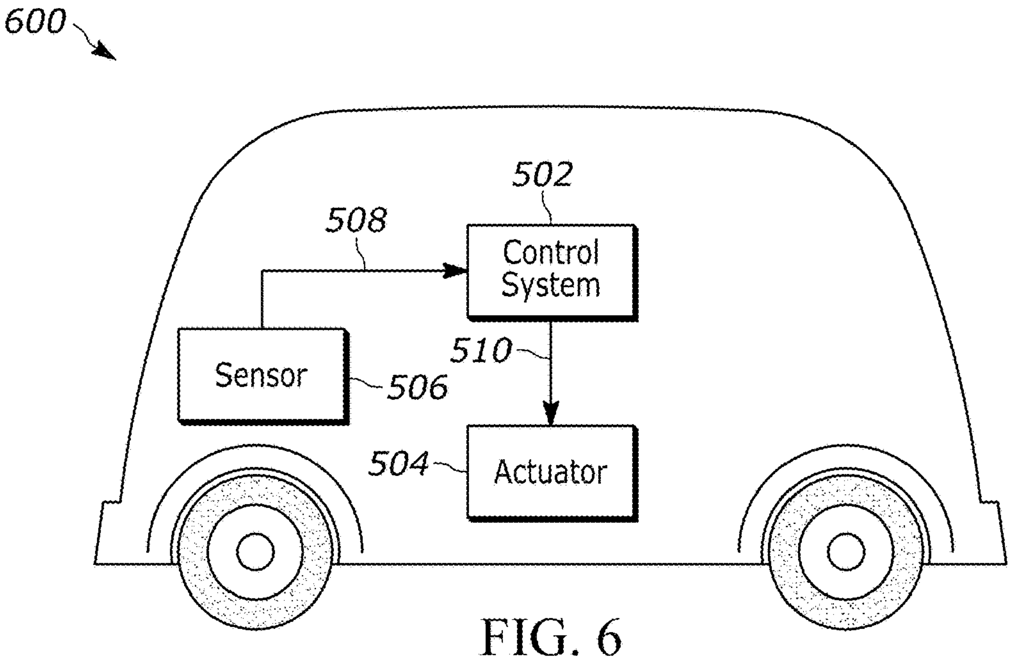
FIG. 6 depicts a schematic diagram of the control system of FIG. 5 configured to control a vehicle, which may be a partially autonomous vehicle, a fully autonomous vehicle, a partially autonomous robot, or a fully autonomous robot, according to an embodiment.

FIG. 6 depicts a schematic diagram of control system 502 configured to control vehicle 600, which may be an at least partially autonomous vehicle or an at least partially autonomous robot. Vehicle 600 includes actuator 504 and sensor 506. Sensor 506 may include one or more video sensors, cameras, radar sensors, ultrasonic sensors, LiDAR sensors, and/or position sensors (e.g. GPS). One or more of the one or more specific sensors may be integrated into vehicle 600. In the context of sign-recognition and processing as described herein, the sensor 506 is a camera mounted to or integrated into the vehicle 600. Alternatively or in addition to one or more specific sensors identified above, sensor 506 may include a software module configured to, upon execution, determine a state of actuator 504. One non-limiting example of a software module includes a weather information software module configured to determine a present or future state of the weather proximate vehicle 600 or other location.

Classifier 514 of control system 502 of vehicle 600 may be configured to detect objects in the vicinity of vehicle 600 dependent on input signals x. In such an embodiment, output signal y may include information characterizing the vicinity of objects to vehicle 600. Actuator control command 510 may be determined in accordance with this information. The actuator control command 510 may be used to avoid collisions with the detected objects.

In embodiments where vehicle 600 is an at least partially autonomous vehicle, actuator 504 may be embodied in a brake, a propulsion system, an engine, a drivetrain, or a steering of vehicle 600. Actuator control commands 510 may be determined such that actuator 504 is controlled such that vehicle 600 avoids collisions with detected objects. Detected objects may also be classified according to what classifier 514 deems them most likely to be, such as pedestrians or trees. The actuator control commands 510 may be determined depending on the classification. In a scenario where an adversarial attack may occur, the system described above may be further trained to better detect objects or identify a change in lighting conditions or an angle for a sensor or camera on vehicle 600.

In other embodiments where vehicle 600 is an at least partially autonomous robot, vehicle 600 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 510 may be determined such that a propulsion unit, steering unit and/or brake unit of the mobile robot may be controlled such that the mobile robot may avoid collisions with identified objects.

In another embodiment, vehicle 600 is an at least partially autonomous robot in the form of a gardening robot. In such embodiment, vehicle 600 may use an optical sensor as sensor 506 to determine a state of plants in an environment proximate vehicle 600. Actuator 504 may be a nozzle configured to spray chemicals. Depending on an identified species and/or an identified state of the plants, actuator control command 510 may be determined to cause actuator 504 to spray the plants with a suitable quantity of suitable chemicals.

Vehicle 600 may be an at least partially autonomous robot in the form of a domestic appliance. Non-limiting examples of domestic appliances include a washing machine, a stove, an oven, a microwave, or a dishwasher. In such a vehicle 600, sensor 506 may be an optical sensor configured to detect a state of an object which is to undergo processing by the household appliance. For example, in the case of the domestic appliance being a washing machine, sensor 506 may detect a state of the laundry inside the washing machine. Actuator control command 510 may be determined based on the detected state of the laundry.

Figure 7:
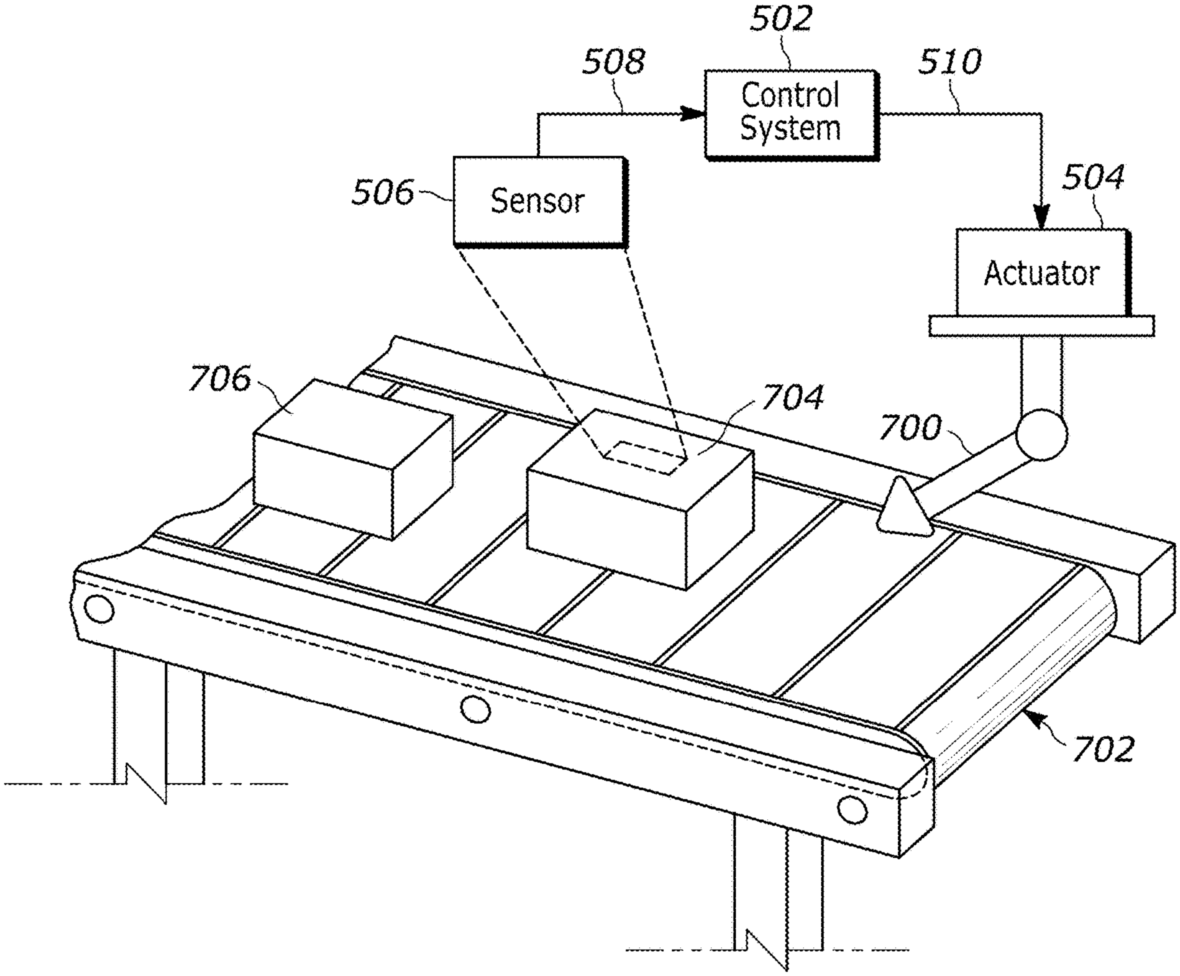
FIG. 7 depicts a schematic diagram of the control system of FIG. 5 configured to control a manufacturing machine, such as a punch cutter, a cutter or a gun drill, of a manufacturing system, such as part of a production line.

FIG. 7 depicts a schematic diagram of control system 502 configured to control system 700 (e.g., manufacturing machine), such as a punch cutter, a cutter or a gun drill, of manufacturing system 702, such as part of a production line. Control system 502 may be configured to control actuator 504, which is configured to control system 700 (e.g., manufacturing machine).

Sensor 506 of system 700 (e.g., manufacturing machine) may be an optical sensor configured to capture one or more properties of manufactured product 704. Classifier 514 may be configured to determine a state of manufactured product 704 from one or more of the captured properties. Actuator 504 may be configured to control system 700 (e.g., manufacturing machine) depending on the determined state of manufactured product 704 for a subsequent manufacturing step of manufactured product 704. The actuator 504 may be configured to control functions of system 700 (e.g., manufacturing machine) on subsequent manufactured product 706 of system 700 (e.g., manufacturing machine) depending on the determined state of manufactured product 704.

Figure 8:
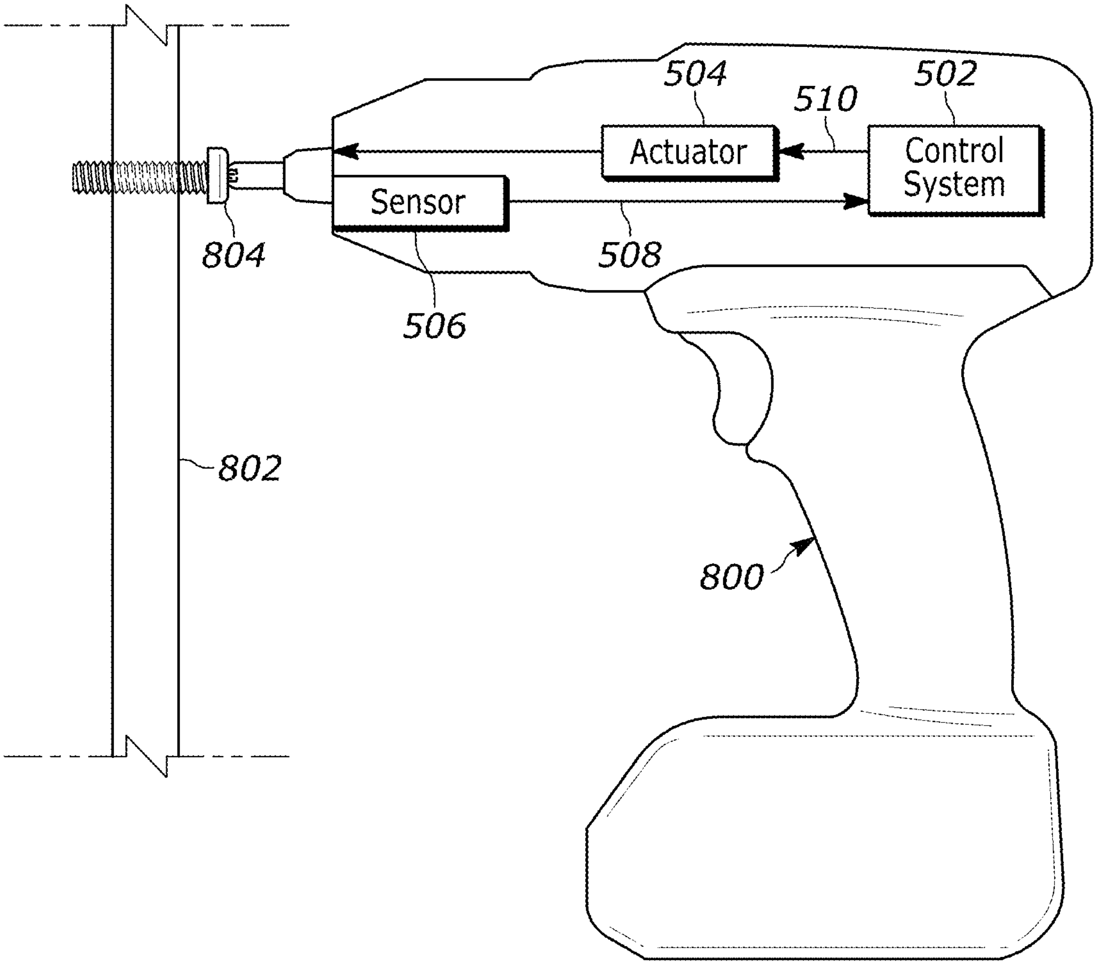
FIG. 8 depicts a schematic diagram of the control system of FIG. 5 configured to control a power tool, such as a power drill or driver, that has an at least partially autonomous mode.

FIG. 8 depicts a schematic diagram of control system 502 configured to control power tool 800, such as a power drill or driver, that has an at least partially autonomous mode. Control system 502 may be configured to control actuator 504, which is configured to control power tool 800.

Sensor 506 of power tool 800 may be an optical sensor configured to capture one or more properties of work surface 802 and/or fastener 804 being driven into work surface 802. Classifier 514 may be configured to determine a state of work surface 802 and/or fastener 804 relative to work surface 802 from one or more of the captured properties. The state may be fastener 804 being flush with work surface 802. The state may alternatively be hardness of work surface 802. Actuator 504 may be configured to control power tool 800 such that the driving function of power tool 800 is adjusted depending on the determined state of fastener 804 relative to work surface 802 or one or more captured properties of work surface 802. For example, actuator 504 may discontinue the driving function if the state of fastener 804 is flush relative to work surface 802. As another non-limiting example, actuator 504 may apply additional or less torque depending on the hardness of work surface 802.

Figure 9:
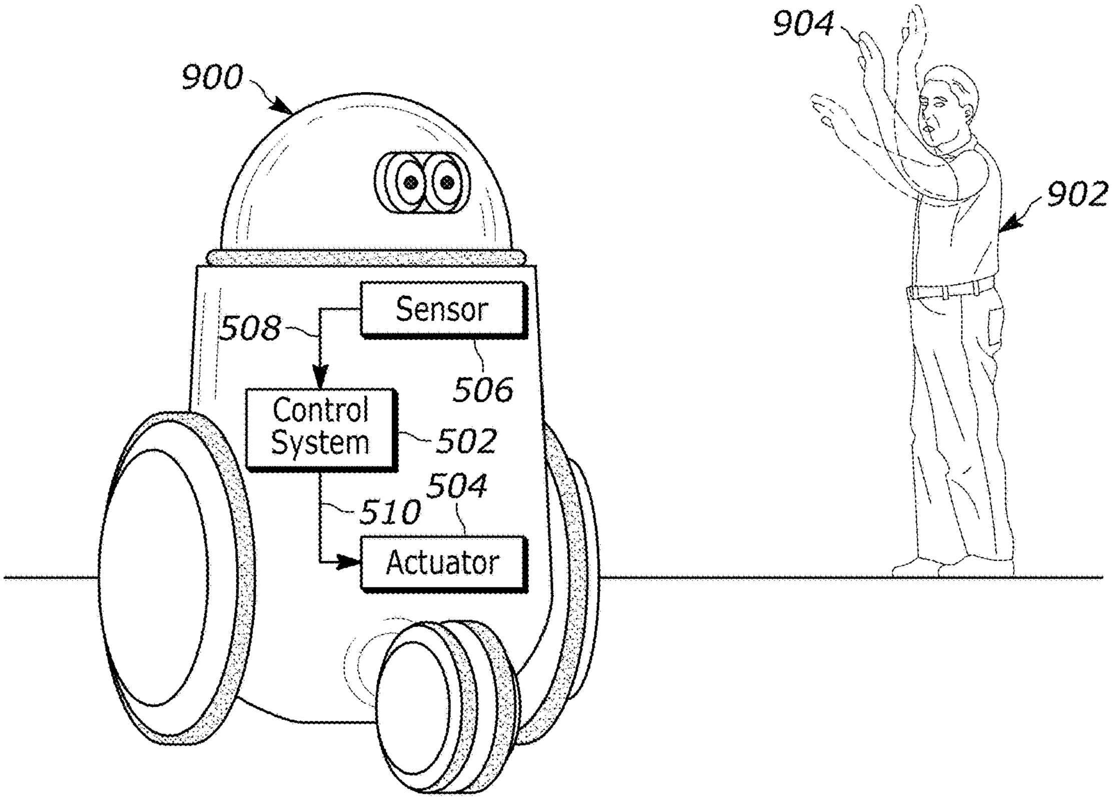
FIG. 9 depicts a schematic diagram of the control system of FIG. 5 configured to control an automated personal assistant.

FIG. 9 depicts a schematic diagram of control system 502 configured to control automated personal assistant 900. Control system 502 may be configured to control actuator 504, which is configured to control automated personal assistant 900. Automated personal assistant 900 may be configured to control a domestic appliance, such as a washing machine, a stove, an oven, a microwave or a dishwasher.

Sensor 506 may be an optical sensor and/or an audio sensor. The optical sensor may be configured to receive video images of gestures 904 of user 902. The audio sensor may be configured to receive a voice command of user 902.

Control system 502 of automated personal assistant 900 may be configured to determine actuator control commands 510 configured to control system 502. Control system 502 may be configured to determine actuator control commands 510 in accordance with sensor signals 508 of sensor 506. Automated personal assistant 900 is configured to transmit sensor signals 508 to control system 502. Classifier 514 of control system 502 may be configured to execute a gesture recognition algorithm to identify gesture 904 made by user 902, to determine actuator control commands 510, and to transmit the actuator control commands 510 to actuator 504. Classifier 514 may be configured to retrieve information from non-volatile storage in response to gesture 904 and to output the retrieved information in a form suitable for reception by user 902.

Figure 10:
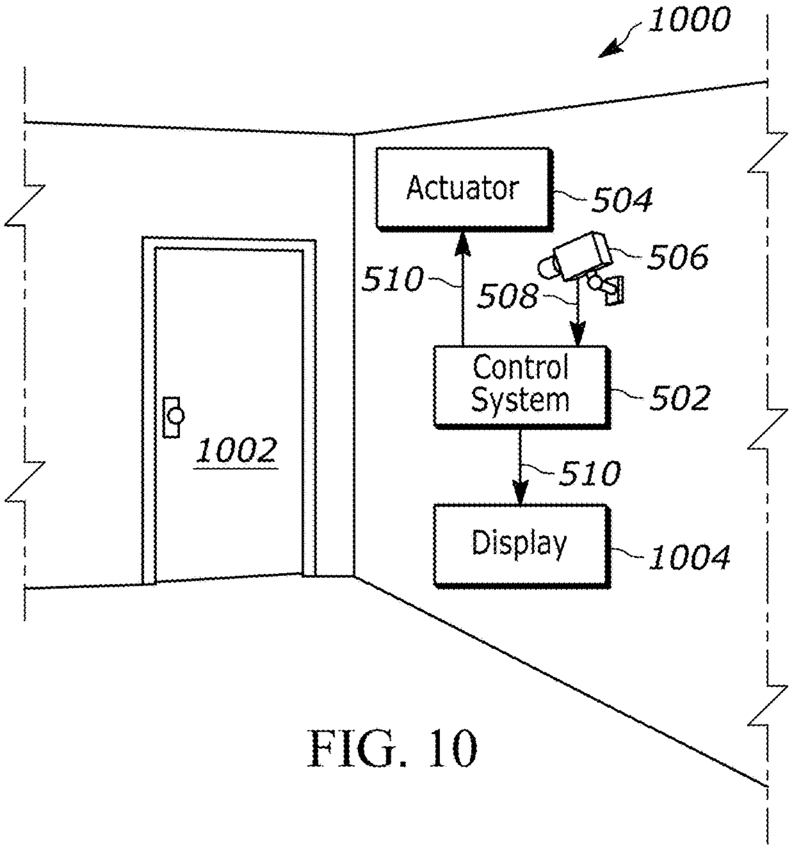
FIG. 10 depicts a schematic diagram of the control system of FIG. 5 configured to control a monitoring system, such as a control access system or a surveillance system.

FIG. 10 depicts a schematic diagram of control system 502 configured to control monitoring system 1000. Monitoring system 1000 may be configured to physically control access through door 1002. Sensor 506 may be configured to detect a scene that is relevant in deciding whether access is granted. Sensor 506 may be an optical sensor configured to generate and transmit image and/or video data. Such data may be used by control system 502 to detect a person's face.

Classifier 514 of control system 502 of monitoring system 1000 may be configured to interpret the image and/or video data by matching identities of known people stored in non-volatile storage 516, thereby determining an identity of a person. Classifier 514 may be configured to generate and an actuator control command 510 in response to the interpretation of the image and/or video data. Control system 502 is configured to transmit the actuator control command 510 to actuator 504. In this embodiment, actuator 504 may be configured to lock or unlock door 1002 in response to the actuator control command 510. In other embodiments, a non-physical, logical access control is also possible.

Monitoring system 1000 may also be a surveillance system. In such an embodiment, sensor 506 may be an optical sensor configured to detect a scene that is under surveillance and control system 502 is configured to control display 1004. Classifier 514 is configured to determine a classification of a scene, e.g. whether the scene detected by sensor 506 is suspicious. Control system 502 is configured to transmit an actuator control command 510 to display 1004 in response to the classification. Display 1004 may be configured to adjust the displayed content in response to the actuator control command 510. For instance, display 1004 may highlight an object that is deemed suspicious by classifier 514. Utilizing an embodiment of the system disclosed, the surveillance system may predict objects at certain times in the future showing up.

Figure 11:
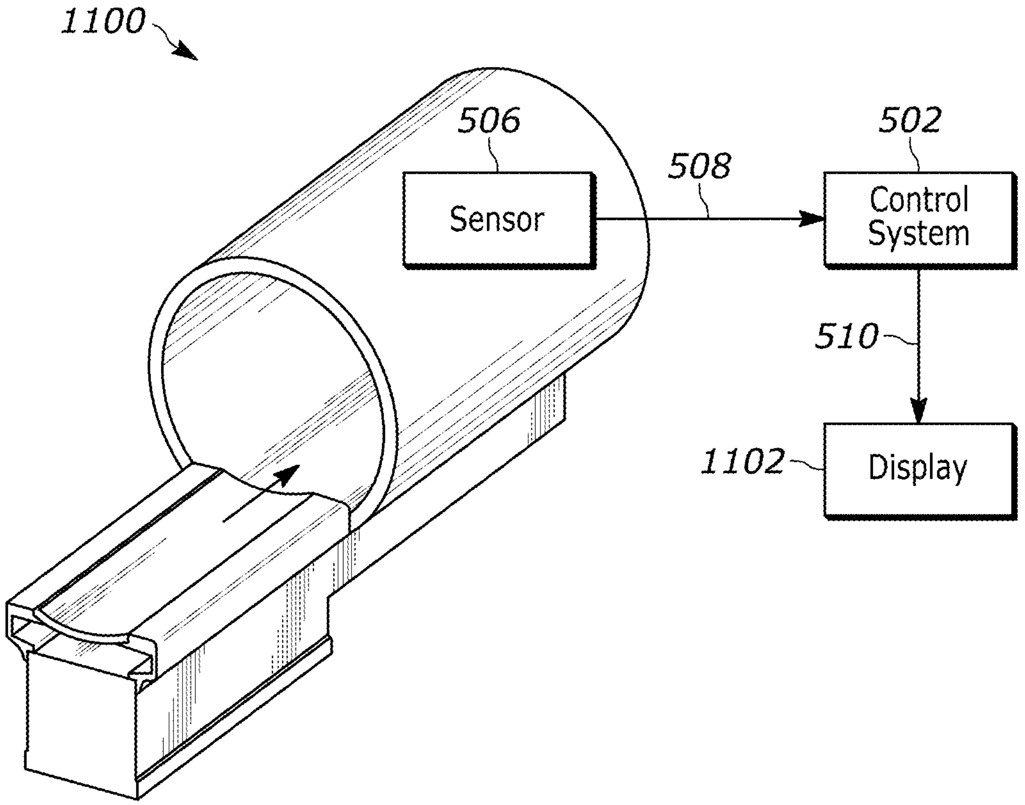
FIG. 11 depicts a schematic diagram of the control system of FIG. 5 configured to control an imaging system, for example an MRI apparatus, x-ray imaging apparatus or ultrasonic apparatus.

FIG. 11 depicts a schematic diagram of control system 502 configured to control imaging system 1100, for example an MRI apparatus, x-ray imaging apparatus or ultrasonic apparatus. Sensor 506 may, for example, be an imaging sensor. Classifier 514 may be configured to determine a classification of all or part of the sensed image. Classifier 514 may be configured to determine or select an actuator control command 510 in response to the classification obtained by the trained neural network. For example, classifier 514 may interpret a region of a sensed image to be potentially anomalous. In this case, actuator control command 510 may be determined or selected to cause display 1102 to display the imaging and highlighting the potentially anomalous region.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A computer-implemented method for a pre-trained machine-learning network, the computer-implemented method comprising the following steps:

(i) receiving a plurality of paired input images, wherein the paired images includes a first set of images from a first modality and a second set of images from a second modality, wherein the first modality is different than the second modality;

(ii) outputting a list of bounding boxes and labels in response to running an image-based object detection model on the first set of images;

(iii) mapping each bounding box to a region of interest that is corresponding to the bounding box and associated with the second set of images from the second modality;

(iv) cropping the region of interest from the first set of images and the second set of images to generate a cropped first set of images and a cropped second set of images;

(v) sending the cropped first set of images to a first encoder and the cropped second set of images to a second encoder, wherein the first encoder is configured for the first modality and the second encoder is configured for the second modality;

(vi) outputting object-level embeddings for both the cropped first set of images and the cropped second set of images utilizing the first encoder and the second encoder, respectively;

(vii) identifying a loss function associated with the first set of images and the second set of images;

(viii) in response to when a threshold is not met, repeating steps (i-vii) and when the threshold is met, outputting final updated parameters associated with the first encoder and the second encoder.

2. The method of claim 1, wherein the image-based object detection model is configured to output coordinates of the bounding box.

3. The method of claim 2, wherein the coordinates are in COCO format.

4. The method of claim 1, wherein the list of bounding boxes includes a class label of a bounding box and a number of bounding boxes per image.

5. The method of claim 1, wherein the first encoder is a contrastive language-image pre-training (CLIP) encoder and the second encoder is a radar encoder.

6. The method of claim 1, wherein the first encoder is an image encoder and the second encoder is a radar encoder.

7. The method of claim 1, wherein the method includes the step of freezing weights associated with the first encoder and second encoder.

8. The method of claim 1, wherein the threshold is associated with a number of bounding boxes per image.

9. The method of claim 1, wherein the threshold includes a loss function size.

10. The method of claim 1, wherein the threshold is a convergence threshold.

11. The method of claim 1, wherein one of a text prompts is associated with a class representative of the one of the plurality of paired input images.

12. The method of claim 1, wherein the network includes a zero-shot model or a few-shot model.

13. A system, comprising:

a controller, the controller configured to:

(i) receive a plurality of paired input images, wherein the paired images includes a first set of images from a first modality and a second set of images from a second modality, wherein the first modality is different than the second modality;

(ii) output a list of bounding boxes and labels in response to running an image-based object detection model on the first set of images;

(iii) map each bounding box to a region of interest that is corresponding to the bounding box and associated with the second set of images from the second modality;

(iv) crop the region of interest from the first set of images and the second set of images to generate a cropped first set of images and a cropped second set of images;

(v) send the cropped first set of images to a first encoder and the cropped second set of images to a second encoder, wherein the first encoder is configured for the first modality and the second encoder is configured for the second modality;

(vi) output object-level embeddings for both the cropped first set of images and the cropped second set of images utilizing the first encoder and the second encoder, respectively;

(vii) identify a loss function associated with the first set of images and the second set of images;

(viii) in response to when a threshold is not met, repeating steps (i-vii) and when the threshold is met, output final updated parameters associated with the first encoder and the second encoder.

14. The system of claim 13, wherein the image-based object detection model is configured to output coordinates of the bounding box.

15. The system of claim 13, wherein the first encoder and the second encoder are different encoders.

16. A computer-implemented method for a pre-trained machine-learning network, the computer-implemented method comprising the following steps:

(i) receiving a plurality of paired input images, wherein the paired images includes a first set of images from a first modality and a second set of images from a second modality, wherein the first modality is different than the second modality;

(ii) outputting a list of bounding boxes and labels in response to running an image-based object detection model on the first set of images;

(iii) mapping each bounding box to a region of interest that is corresponding to the bounding box and associated with the second set of images from the second modality;

(iv) cropping the region of interest from the first set of images and the second set of images to generate a cropped first set of images and a cropped second set of images;

(v) sending the cropped first set of images to a first encoder and the cropped second set of images to a second encoder, wherein the first encoder is configured for the first modality and the second encoder is configured for the second modality;

(vi) outputting object-level embeddings for both the cropped first set of images and the cropped second set of images utilizing the first encoder and the second encoder, respectively; and (vii) identifying a loss function associated with the first set of images and the second set of images.

17. The method of claim 16, wherein the image-based object detection model is configured to output coordinates of the bounding box.

18. The method of claim 16, wherein the first encoder and the second encoder are different encoders.

19. The method of claim 16, wherein the method includes the step of, in response to when a threshold is not met, repeating steps (i-vii) and when the threshold is met, outputting final updated parameters associated with the first encoder and the second encoder.

20. The method of claim 16, wherein the first encoder and the second encoder are CLIP encoders, dyno encoders, or pre-trained ViT (Vision Transformers) encoders.

* * * * *